Patented July 30, 1946

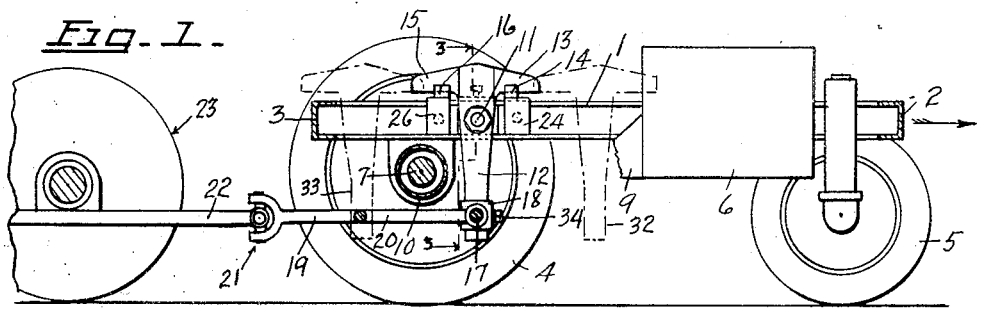
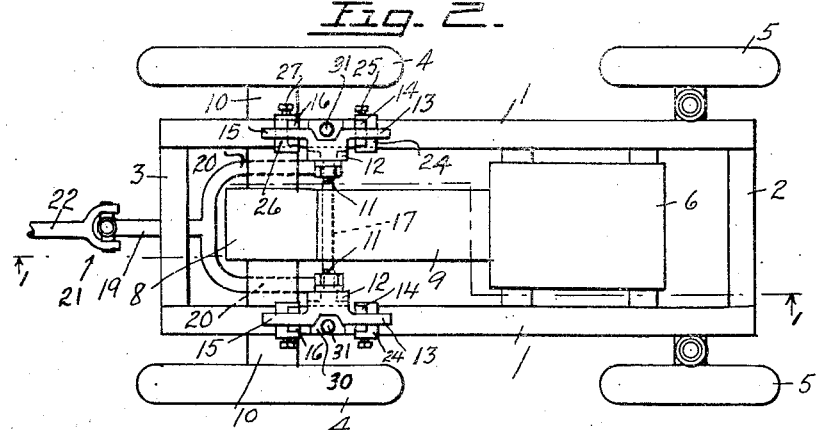
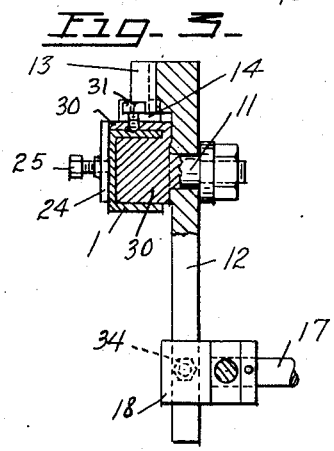
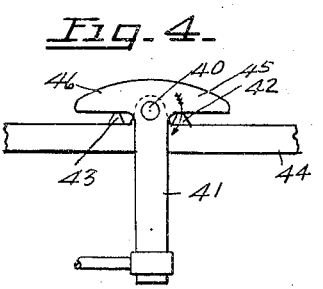
July 30, 1946.   C. H. SAUER   2,404,925
COUPLING DEVICE
Filed June 5, 1944
INVENTOR.
CHRISTIAN H. SAUER
BY
Boyken, Mohler & Beckley
ATTORNEYS.

2,404,925

UNITED STATES PATENT OFFICE 2,404,925

COUPLING DEVICE

Christian H. Sauer, Chico, Calif.

Application June 5, 1944, Serial No. 538,830

4 Claims. (Cl. 280—33.44)

This invention relates to a coupling device for use in coupling a tractor, or the like, with a load to be moved.

The word "tractor," as used herein, is intended to include any power driven vehicle in which the power for moving it is transmitted to the surface supporting the same for effecting such motion. Whether the vehicle is of the wheel mounted or creeper type is immaterial.

The word "load," as used herein, is intended to include any load to be pulled or pushed. Thus the load might be wheel supported trucks or tractors that in turn would carry loads, or it might be plows, planters, harvesters, cultivators, scrapers, or any earth working or moving implements of either the type to be pushed or pulled. The "load" might consist of a stump, log or boulder to be drawn or pushed. Thus it is seen that the load referred to herein may be any object, independent of the vehicle, to be moved, and by "independent" I mean such objects as are not carried in their entirety by the power driven vehicle itself.

The principal object of the invention is the provision of a coupling which, in use, is adapted to transmit the thrust or pulling force for moving the load to the power driven treads or elements that are in frictional engagement with the surface supporting the power driven vehicle so as to increase the frictional resistance between such treads or elements and said surface. This thrust or pulling force is generally transmitted through a coupling to a cable chain, drawbar or push bar in a direction that substantially conforms to the direction of movement of the vehicle. The transmission thereof to the treads or elements that are in frictional engagement with the surface supporting the vehicle is in a generally downward direction toward said surface for effecting such increase in friction between the said surface and the said treads or elements, where my invention is used.

Numerous beneficial results follow or go along with the accomplishment of the foregoing object. For example, a light weight tractor is enabled to pull or to push a much heavier load than heretofore. Where the vehicle uses pneumatic tires on the drive wheels, the same will wear much longer and may use much higher air pressures. Also the steering is easier and vibration is reduced and the danger of upsetting the tractor due to the load being pulled or pushed is eliminated. Other objects and advantages will appear in the description and in the drawing, although it is to be understood that the drawing and description are merely illustrative of a simple and effective form of the invention and are not to be considered restrictive thereof.

In the drawing,

Fig. 1 is a semi-diagrammatic sectional view through a tractor as taken generally along line 1—1 of Fig. 2. A portion of a load being pulled is indicated in the drawing.

Fig. 2 is a plan view of the tractor of Fig. 1.

Fig. 3 is an enlarged sectional view taken along line 3—3 of Fig. 1 and through the coupling device.

Fig. 4 is a fragmentary, semi-diagrammatic, elevational view of a slight modification of the invention as shown in Fig. 1.

In detail the tractor may have a conventional frame that comprises side frame members 1, connected by front and rear end members 2, 3. Rear drive wheels 4 and front steering wheels 5 rotatably carried by the frame support the tractor for movement over the ground. The rear drive wheels may be connected in any suitable manner with engine 6 for driving of said wheels, the said engine being carried by the frame. In the drawing, the rear drive wheels are secured to coaxial axles 7 (only one being seen in Fig. 1), that are driven through differential gears in a differential housing 8, and the drive shaft and transmission connecting the differential gears with the engine may be in any suitable housing 9 (Fig. 2), and the rear axles 7 are enclosed in axle housing 10.

The side frame members 1 each carries a shaft or pivot 11, the same being in coaxial alignment and at right angles to the longitudinal axis of the tractor. Pivotally supported on each pivot 11 is a lever 12 projecting downwardly therefrom, the pivot being adjacent the upper end of each lever. A laterally extending arm 13 rigid with the upper end of each lever 12 projects over the frame members 12 adjacent thereto and forwardly relative to the rear end of the tractor. Between each arm 13 and each such side frame member and extending across the upper side of the latter, is a stop member 14 engageable by each arm 13.

Preferably each lever 12 also carries an arm 15 extending rearwardly from the upper end thereof and over each frame member 1 in the same manner as arm 13 projects forwardly from the lever. Arms 13, 15 may be identical in form and in alignment (Fig. 2) over each frame member 1. A stop member 16 of the same structure as stop member 14 is carried by each frame member 1 between the latter and each arm 15.

A shaft 17 may extend between the lower ends of levers 12, the ends of which shaft may be secured in clamps 18 that are secured to each lever 12.

A drawbar 19 is secured to one of the connecting ends of the yoke arms 20, while the opposite spaced ends of said arms 20 are pivotally supported on shaft 17 adjacent the lower ends of levers 12 and adjacent clamps 18. Drawbar 19 is centrally of the width of the tractor and may be pivotally connected by joint 21 with the tongue 22 of the load, generally designated 23, to be pulled.

The stop members 14 are each preferably carried on a clamping member 24 for clamping by a set screw 25 to the frame member 1 that carries the same. These clamping members 24 may each be slipped longitudinally of each frame member 1 to any desired point relative to the pivot 11 that carries lever 11 so as to position each stop member 14 relatively close to each pivot 11, or farther away, as may be desired.

The stop members 16 are carried on clamping members 26 that are identical with clamping members 24, and each member 26 carries a set screw 27 for securing it to the frame member 1 in any desired adjusted position relative to pivot 11.

Each pivot 11 is carried on a clamping member 30 for movement of each said pivot longitudinally of the frame member 1 that supports it. A set screw 31 on each member 30 may clamp the same in adjusted position of pivot 11 to each frame member. Thus the lever 12 and arms 13, 15 therein may be moved forwardly to position 32 (Fig. 1) or rearwardly to position 33, or to any desired point along the side frame members 1.

The clamping members 18 with which drawbar 19 is connected may each be moved longitudinally of lever 12 carrying each such member 18 and a set screw 34 functions to releasably secure each clamping member 18 in its adjusted position either closer or farther from pivot 11 as may be desired.

The pivotal connection between yoke arms 20 and the lower ends of arms 12 is preferably about even with or below the level of the axles 7 for the type of tractor illustrated, and where the transmission and engine housings are substituted for frame members, as is the case in some kinds of tractors, the lever arm 12 may be pivotally supported at any suitable point on the transmission or differential housing, or on the axle housing in some cases. However, the pivots 11 preferably are not coaxial with the axis of rotation of the rear drive wheels, but forwardly thereof.

In operation, upon connecting the coupling device with the load 23, and upon applying power to the drive wheels 4, the pulling force on the drawbar is transmitted through levers 12, pivots 11 to stop members 14 in a downward direction on said stop members. As the latter are directly connected with the wheels 4 through the frame members 1 and the axle housing, it is seen that the pressure of the tire treads against the supporting surface is greatly augmented beyond that resulting purely from the weight of the tractor, and this pressure is proportional to the distance between pivots 11 and the shaft 17 that carries yoke arms 20, and between pivots 11 and the stop members 14.

The position of the levers 12 relative to the forward and rear ends of the tractor depends upon the type of tractor used and the degree of friction desired. In a tractor of the creeper type or of the four-wheel-drive type, the levers may be moved forwardly a greater distance than where the tractor is of the type shown, or several sets of levers may be used, a pair being adjacent the front end and a pair adjacent the rear. Also a front-wheel-drive tractor will present a different problem, and the levers are positioned to give the best efficiency for this type of tractor.

In Fig. 4 is shown a type of coupling device that is somewhat similar to that shown in Fig. 1, but which type produces a straight downward force when in operation. In this device the pivot 40 at the upper end of vertical lever 41 is level with the points of engagement between stop members 42, 43 on each frame member 44 and the forwardly and rearwardly projecting arms 45, 46 that are secured to the upper end of said lever. In some instances this type of structure is preferred to that of Fig. 1, but the principle is the same in each case.

Where the tractor is used for pushing a load, the arms 15 of Figs. 1, 2 and 46 of Fig. 4, function in the same manner as the forwardly projecting arms, it being understood that the levers 12 or 41 are coupled with the load to be pushed so as to transmit the compressive tension on the push bar or bars to the levers.

The beneficial results that follow along with the increased traction provided by my invention, have already been mentioned and are thought to be obvious.

Having described the invention, I claim:

1. In combination with a tractor and a load to be moved over the ground thereby, a coupling for connecting said load with said tractor, said coupling including means for transmitting the force for moving said load to said tractor in a generally downward direction for increasing the traction between said tractor and the ground, said coupling comprising a lever pivotally secured to said tractor for swinging about a horizontal axis, one end portion of said lever extending downwardly from said pivot, means connecting the lower end of said end portion with said load, the opposite end portion of said lever extending generally horizontally from said pivot for swinging generally downwardly upon movement of the tractor over the ground for placing said means under tension, and means rigid with said tractor for limiting said downward movement of said opposite end portion.

2. In combination with a power driven tractor having a pair of drive wheels, a coupling for connecting said tractor with a load separate therefrom to be moved thereby, said coupling including a generally vertically extending lever pivotally secured to said tractor adjacent its upper end and projecting at its lower end to a point below the level of the axis of said drive wheels, means at said point for connecting said lever with such load, a generally horizontally extending arm projecting laterally from the axis of said pivot and rigid with said lever for swinging about said pivot, the axis of said pivot being positioned above the axis of said drive wheels and substantially parallel therewith, and stop means below said arm and rigid with said tractor for limiting the movement of said arm when said lever is connected at said point with such load for moving the latter.

3. A device of the character described adapted to be secured to a tractor for coupling the same with a load to be moved over the ground thereby comprising a member having a generally vertically extending arm and a laterally extending arm, said arms being rigidly connected together for swinging together about a horizontal axis, a pivot adapted to be secured to said tractor for supporting said arms for so swinging, stop means adapted to be carried by said tractor in a position for engagement with said laterally extending arm for limiting the swinging thereof when a load to be moved by such tractor is connected with said vertical arm at a point spaced from said pivot, means for so connecting a load with said vertical arm, said pivot being spaced above said last mentioned means.

4. A device of the character described adapted to be secured to a tractor for coupling the same with a load to be moved over the ground thereby comprising a member having a generally vertically extending arm and a laterally extending arm, said arms being rigidly connected together for swinging together about a horizontal axis, a pivot adapted to be secured to said tractor for supporting said arms for so swinging, stop means adapted to be carried by said tractor in a position for engagement with said laterally extending arm for limiting the swinging thereof when a load to be moved by such tractor is connected with said vertical arm at a point spaced from said pivot, means for so connecting a load with said vertical arm, said pivot being spaced above said last mentioned means, said stop means being movable relative to said laterally extending arm to a plurality of different distances from said pivot, and said last mentioned means being movable relative to said vertical arm to a plurality of different distances from said pivot.

CHRISTIAN H. SAUER.